(12) United States Patent
Wehrli et al.

(10) Patent No.: US 11,820,094 B2
(45) Date of Patent: Nov. 21, 2023

(54) POWDER PRESS HAVING TOGGLE LEVER DRIVE AND ELECTRIC DRIVE

(71) Applicant: OSTERWALDER AG, Lyss (CH)

(72) Inventors: Alex Wehrli, Kehrsatz (CH); Michael Sollberger, Lyss (CH); Curdin Maissen, Wetzikon (CH); Roland Hänni, Zurich (CH)

(73) Assignee: Osterwalder AG, Lyss (CH)

( * ) Notice: Subject to any disclaimer, the term of this patent is extended or adjusted under 35 U.S.C. 154(b) by 592 days.

(21) Appl. No.: 16/968,853

(22) PCT Filed: Feb. 25, 2019

(86) PCT No.: PCT/EP2019/054620
§ 371 (c)(1),
(2) Date: Aug. 10, 2020

(87) PCT Pub. No.: WO2019/162511
PCT Pub. Date: Aug. 29, 2019

(65) Prior Publication Data
US 2021/0016534 A1   Jan. 21, 2021

(30) Foreign Application Priority Data
Feb. 26, 2018 (EP) .................................... 18158665

(51) Int. Cl.
*B29C 45/66* (2006.01)
*B30B 11/02* (2006.01)
(Continued)

(52) U.S. Cl.
CPC ................ *B30B 11/02* (2013.01); *B22F 3/03* (2013.01); *B22F 2003/033* (2013.01);
(Continued)

(58) Field of Classification Search
CPC ...... B29C 45/66; B29C 45/661; B29C 45/662
(Continued)

(56) References Cited

U.S. PATENT DOCUMENTS 5,176,923 A    1/1993   Ito
2009/0317507 A1   12/2009   Eisenberg et al.
(Continued)

FOREIGN PATENT DOCUMENTS

DE           4401499 A1    8/1995
DE      102004052007 A1    4/2006
(Continued)

OTHER PUBLICATIONS

International Search Report issued in PCT/EP2019/054620 dated Jun. 18, 2019, 7 pages.
Written opinion issued in PCT/EP2019/054620 dated Jun. 18, 2019, 5 pages.

*Primary Examiner* — Thu-Khanh T. Nguyen
(74) *Attorney, Agent, or Firm* — Pearne & Gordon LLP

(57) ABSTRACT

The invention relates to a powder press (1) for producing a pressed article from a material that can be pressed, having a press frame (10), an upper and/or lower punch assembly (14) and a die assembly, which define a molding cavity, into which the material that can be pressed can be introduced, and an electric drive unit (12) which is operatively connected to the punch assemblies (14) and/or the die assembly, wherein, in order to mold the pressed article, the punch assemblies (14) and the die assembly can be moved relative to each other along a pressing axis (18) and pressed against each other by means of the electric drive unit (12). Furthermore, the operative connection between the electric drive unit (12) and one of the punch assemblies (14) comprises a toggle lever drive (16) which moves the punch assembly (14) into a pressing end position along the pressing axis (18).

15 Claims, 5 Drawing Sheets

(51) Int. Cl.
*B22F 3/03* (2006.01)
*B30B 1/10* (2006.01)
*B30B 1/18* (2006.01)

(52) U.S. Cl.
CPC ........... *B22F 2999/00* (2013.01); *B29C 45/66* (2013.01); *B30B 1/103* (2013.01); *B30B 1/186* (2013.01)

(58) Field of Classification Search
USPC .............. 425/150, 451.6, 186, 167, 193, 78, 425/340–361, 406–423
See application file for complete search history.

(56) References Cited

U.S. PATENT DOCUMENTS

2011/0083568 A1* 4/2011 Fahrenbach ............ B30B 1/266
100/214
2014/0178515 A1* 6/2014 Yamaguchi et al. .........................
B29C 45/7626
425/139

FOREIGN PATENT DOCUMENTS

| | | |
|---|---|---|
| EP | 0436792 A2 | 7/1991 |
| EP | 2311587 A1 | 4/2011 |
| EP | 2998989 A1 | 3/2016 |
| JP | 2001259896 A | 9/2001 |
| JP | 2001300778 A | 10/2001 |
| JP | 2002103089 A | 4/2002 |

* cited by examiner

POWDER PRESS HAVING TOGGLE LEVER DRIVE AND ELECTRIC DRIVE

TECHNICAL FIELD OF THE INVENTION

The invention relates to a powder press for producing a pressed article from a material that can be pressed.

PRIOR ART

In general, presses, in particular powder presses, have a press frame, an upper and a lower punch assembly and a die assembly between the two punch assemblies. The punch assemblies and the die assembly form a mold cavity into which the, in particular powdery, material to be pressed is introduced. In order to mold a pressed article, the upper and lower punch assemblies, comprising at least one tool plane having a tool or respectively at least one punch, are pressed against each other, wherein the punch assemblies are moved depending on settable pressing parameters. A punch assembly comprises in the simplest case one punch, but in general has a plurality of punches. Assemblies having multiple punches are also known in order to press multiple height levels in the pressing direction, wherein the individual punches are moved relative to each other at different speeds and/or stroke distances and are received in one tool plane. In a pressing end position, in which a full pressing force acts by way of a press drive, the punch assemblies can be supported by way of fixed stops such that a defined pressing position is assumed. The very high pressing forces required in the pressing direction and the quantity of energy are largely produced by hydraulic, mechanical or electric drive systems in known powder presses.

In the case of powder presses for producing dimensionally stable pressed articles, in addition to drive systems for moving the punch assemblies in the pressing direction, hydraulic, electric or other driven actuating drives, which are known per se, are also provided in order to adjust individual upper or respectively lower punch carriers or respectively punches relative to each other.

In general, movements in a powder press are produced mechanically, hydraulically or electrically. In mechanical presses the sequence of movements is substantially pre-defined, e.g. by a toggle lever drive. In the case of mechanical presses, high numbers of strokes can be realized with low energy consumption and reasonable maintenance costs. Admittedly, the flexibility for moving the punch assemblies is comparatively low.

Regulated hydraulic drive systems are used in known hydraulic presses in order to independently move the individual punch assemblies. The individual movement of individual punch assemblies requires high flexibility. Due to a use of measuring systems and a regulation of the sequence of movements based thereon, high precision and dynamics are produced during the pressing operation. Admittedly, in the case of hydraulic presses, a high energy requirement and long cycle times are to be expected. Punch assemblies having the arranged punches can be supported directly by way of a piston/cylinder assembly, wherein fixed stops are admittedly required in general due to the high pressing forces. A counter force acting on a punch during the pressing process is received by the hydraulic cylinder. The counter force varies as a function of the punch such that, in the case of complex pressed article shapes, an individual hydraulic cylinder is allocated to each punch. Accordingly, hydraulic presses comprise a plurality of hydraulic cylinders, which requires a complex system.

Electric presses comprise electric drive systems, e.g. electric spindle drives, for driving. In this case, average numbers of strokes can be realized with a low energy requirement, wherein the pressing operation is possible with high precision and flexibility and with a low space requirement and low maintenance costs.

An electric powder press, in which an upper punch assembly has an upper spindle drive and the die assembly and/or a lower punch assembly has a lower spindle drive, is known from EP 2 311 587 A1. It is also known that spindle drives comprising a spindle/nut assembly or a nut/spindle assembly are operatively connected to a motor unit, the rotational movement of which is transmitted as a linear movement into a drive train. As a rule, the spindle nut acts by way of a force transmission device on the upper and/or lower punch plate of a punch assembly and moves, together with the latter, the upper punch and/or lower punch in the direction of a main pressing axis which runs parallel at a distance or coaxially to the longitudinal axis of the spindle. A short drive train is created by a spindle drive, as a result of which high stiffness and, consequently, high dynamics of the press drive can be attained even with large moved masses and/or large pressing forces.

The motor unit can be a servo motor assembly, wherein in particular a rotation angle sensor for regulating the rotation angle or respectively a torque sensor for regulating the torque as well as a position sensor for detecting the linear position of the respective punches are provided. With a targeted actuation of individual punches, a flexible process control is made possible such that during a pressing operation a constant movement of all punches and an adaptation of the movement can be effected, taking account of relevant parameters, including material-related parameters.

Powder presses having an electromechanical drive system can furthermore, comprise passive drive elements such as spindles, belts, gears, eccentrics and/or toggle levers which are arranged between the electric drive unit and a punch assembly to be driven, in order to transmit a pressing force as a main pressing force, produced by an electric drive. It is true that presses having an electromechanical drive system have a lower energy requirement than hydraulic presses but, having said that, only a lower stiffness and fewer dynamics can in general be achieved by the passive drive elements. In particular, in the case of servo motor-driven powder presses, there exists the problem that a transmission of a rotational movement into a translational movement can be influenced by various physical variables such that a reliable and defined pressing operation is only possible with a high regulating outlay. Furthermore, these powder presses are deemed to be failure-prone and susceptible to wear, in particular due to the impact sensibility of a comprised spindle and, consequently, costly. Non-linear drive systems, in particular a toggle lever drive, are accordingly considered to be unsuitable for use in powder presses, inter alia since they only produce a maximum pressing force in a very limited region.

A powder press having punch-carrying plates and a die which are adjustable relative to each other is known from US 2009/0317507 A1. An electric motor serves as a drive for these in each case, wherein the plate or die is connected by means of a central gear wheel and two gears to the electric motor. Passive drive systems are not provided.

A hydraulic powder press, wherein an upper and a lower punch assembly are moved by way of separate or combined hydraulic drive systems, is known from JP 2001-259896. In this case, the vertical movement of the upper and the lower punch assembly is coupled to each other by way of couplings. A toggle lever system is arranged between the hydraulic drive and at least the upper punch assembly in such a way that the movement of the hydraulic cylinder is transmitted to the die assembly and the punch assembly by the toggle lever system, wherein the compression force transmitted to the punch assembly is many times larger than that of the hydraulic cylinder used. The comprised hydraulic drive, which induces a high energy requirement and noise and is high-maintenance due to the high flow rates of hydraulic oil in connection with the toggle lever system, proves to be disadvantageous.

The object of the present invention is to provide a powder press for producing a pressed article from a material that can be pressed, which makes possible an ideal pressing course according to an optimum compaction course of the material that can be pressed and during which high compression forces can be transmitted.

Starting from the prior art, a powder press for producing a pressed article from a material that can be pressed, having a press frame, a tool having an upper and/or lower punch assembly and a die assembly is proposed, which define a molding cavity, into which the material that can be pressed can be introduced. In order to press parts having a complex structure, multiple punches are inserted from above and/or below into a die opening of the die assembly, wherein each punch is arranged on a punch carrier which can each be moved relative to a base carrier or respectively base plate. In particular, this is a multi-plate press, in which during a pressing process individual tool planes, also referred to as additional axes, are moved into an individual pressing position. An assembly comprising a punch and moving and adjusting tool components carrying said punch, i.e. those elements which are located between the press drive and the punch on force flux lines and, in particular, comprise the plate, cylinder, supporting device and guides, is understood to be an additional axis.

The powder press for producing a pressed article from a material that can be pressed comprises at least one electric drive unit for producing a main pressing force, wherein the electric drive unit is operatively connected to the upper and/or lower punch assemblies and/or the die assembly such that the punch assemblies and the die assembly can be moved relative to each other along a pressing axis and can be pressed against each other.

According to the invention, the operative connection between the electric drive unit and the upper punch assembly comprises a toggle lever drive which moves the upper punch assembly into a pressing end position along the pressing axis.

The combination according to the invention of an electric drive unit having a toggle lever drive for moving at least one of the punch assemblies is distinguished with respect to hydraulic powder presses having a toggle lever system by reduced noise, high energy efficiency and a largely low-maintenance drive. The electric drive unit shows an improved level of efficiency, in particular when permanent-magnetic synchronous servo assemblies, which can be driven with low frictional losses, are used. Furthermore, a safety hazard due to escaping hydraulic oil is averted, which otherwise represents a problem in powder metallurgy. Moreover, this advantageously results in high precision and good reproducibility, as well as good and reliable regulatability and, thus, a dynamic movement control of the pressing operation. Operating is also simplified since there is a lower risk of operating and setting errors.

The electric drive unit comprises, in an exemplary embodiment, a spindle drive, wherein a drive motor acts directly on the spindle which is operatively connected to the toggle lever drive and this, in turn, acts on the punch assembly and/or die assembly. The spindle drive is preferably a regulated spindle drive, as a result of which properties of a utilized powder material as well as properties of the pressed article produced from the powder material can be considered.

The regulated spindle drive is preferably a servo motor assembly having a rotation angle, rotational speed and/or torque sensor in order to regulate the rotation angle, rotational speed and/or torque. Furthermore, these sensors can be provided in interaction with a position sensor for detecting a linear position of the respective punch or the die, wherein signals can be transferred to a control unit which is used to regulate the electric drive unit, e.g. the servo motor assembly. Accordingly, operating parameters can be detected, stored in storage means and further processed in processing units. Furthermore, further sensors can be provided, which detect a spindle position and/or a modification in the spindle position as well as sensor devices for detecting a spindle torque which is designed to initiate an emergency stop or respectively to initiate an idle stroke. Furthermore, force measuring and/or distance measuring systems can be used, which allow a regulation based on the force and/or on the position.

In order to realize as compact a design as possible, a servo motor can be configured as a hollow shaft electric motor, in which the element to be rotated of the spindle drive is received in the interior of the hollow shaft.

In order to further develop a powder press having a spindle drive, the toggle lever drive is arranged between the spindle or a possibly arranged ram and punch assembly, according to the invention, such that high precision and dynamics can be attained due to the high stiffness in the pressing region. The toggle lever drive is provided as a passive drive element which, together with the electric drive unit, produces the main pressing force to be applied of an electromechanical powder press. With the combination of the passive and the active drive element it is possible for the electric drive unit to have a very compact construction. The force to be applied by the electric drive unit can be reduced by approximately a factor of 10, compared with purely electric powder presses.

In an embodiment, a servo motor assembly is provided in order to drive the spindle drive, wherein the characteristics provided in terms of dynamics, actuating ranges and accuracy of the movements provided by a servo motor assembly meet the requirements during the pressing operation. Servo motor assemblies can be operated with considerable rotational speed and torque changes as well as a high holding torque when stopped. In particular, increased dynamics can be attained due to the reduced size of the servo motor assembly used in the powder press according to the invention.

In general, a servo motor assembly comprises a servo inverter for supplying power, the dimensioning of which is considerably dependent on a peak load (peak current) that occurs. A peak load is largely reached in the pressing position. In the electromechanical powder press according to the invention, the peak load is reduced by a factor of approx. 10 compared with a powder press having direct drive. In the case of a direct drive, the drive is transmitted to a spindle and directly from the spindle directly or by way of a ram to the punch assembly. Due to the smaller size of the servo motor assembly used in the electromechanical powder press, the required electric installations, e.g. cables and preliminary fuses, can also be simplified.

Based on the knowledge of an optimum kinematic pressing course for producing dimensionally stable pressed bodies, a geometric design of coupling members of the toggle lever drive according to the invention coordinated therewith is provided. Accordingly, individual phases of a product-specific pressing cycle, which coordinates e.g. compacting, pressurizing and pressure relief with each other, can be achieved by a targeted dimensioning of geometric parameters. The kinematics and transmission ratio are approximated to an ideal course of a pressing operation with high reproducibility and high speeds.

The toggle lever drive integrated into the electromechanical powder press, which preferably connects the electric drive unit for producing a main pressing force to an upper piston or respectively upper punch assembly has a symmetrical construction. Starting from a drive train of the electric drive unit, a first and a second lever are each swivelably hinged to a first end of the levers. A first arm for connection to the frame of the powder press and a second arm for connection to the upper punch assembly are each swivelably hinged to a second end of the respective levers.

A toggle lever drive is generally distinguished by a changing transmission ratio of the applied force to the resulting force. For a pressing operation, a rapid approaching of a pressing position or respectively a rapid moving out of the pressing end position is desired, wherein the latter is advantageous for exposing the pressed molded article. A first portion of a pressing cycle can be effected at average speed, wherein average compression forces act. In the vicinity of the fully extended region of the toggle lever drive, the last pressing cycle phase is then effected before the pressing end position at low speed and high compression forces, which can also be realized with small electric drive systems. A high transmission ratio in the vicinity of the fully extended region of the toggle lever drive allows a precise regulation of the pressing position. Furthermore, it turns out to be advantageous that the changing transmission ratio is effected without a changeover procedure or respectively an interruption such that a movement during the transition from a rapid traverse to a pressing operation is effected without an interruption and, therefore, largely continually. The pressed article can be continually demolded without being exposed to further stresses, for example due to the comprised gear.

The kinematics of the toggle lever drive can be determined in such a way that the course of the transmission ratio corresponds to the course of the powder compaction, wherein the pressing force is expressed as a function of a pressing movement and, in particular, increases with this at the end of the powder compaction.

Moreover, toggle lever drives in connection with powder presses have to be designed and embodied in such a way that during a pressing procedure an adjustment of the pressing punches along the pressing direction into a defined end position, i.e. into the pressing end position, can be reproduced. In particular, a low-maintenance and long-life toggle lever drive should be provided, which preferably only comprises rotative bearings and no linear guides or combined sequences of movements.

The setting of the pressing end position is of central importance for a successful pressing operation for producing dimensionally stable pressed articles from a material which is substantially in powder form or in granular form. According to the invention, mechanical fixed stops for specifying pressing points of additional axes are provided, which define the rise of the pressed article or respectively green body. Consequently, in the pressing end position, punch carriers, to which a punch is in each case affixed, are rigidly supported or respectively supported in a force-transmitting manner on mechanical fixed stops which are consequently configured to be adjustable in height in an embodiment.

Moreover, punches or respectively tools in powder presses are configured with different lengths and are exposed to different stresses, such that tools have to be reground over their life. This necessitates the provision of a pressing height adjustment which is arranged, for example, as an additional drive usually on the upper part of the press and, accordingly, displaces the entire base of the upper piston in the vertical direction. This height adjustment is, admittedly, costly and adds further sources of errors to the machine geometry.

As already explained above, the problem with powder presses having non-linear drive kinematics, in particular those having a toggle lever drive, is essentially that a maximum pressing force is only achieved in a narrow region, formulated in a tapered manner, at precisely one point. Outside of the region or respectively of the point, the compression force produced is either insufficient or respectively considerably reduced, or the system cannot be regulated. According to the invention, fixed stop devices are provided in combination with the electromechanical powder press according to the invention, which make possible both a height adjustment of the respective pressing end position of the comprised punch assemblies and, thus, the pressed article height, and a height adjustment for offsetting wear or buckling of the punches used. The adjustable fixed stop devices provided according to the invention reduce the complexity of such electromechanical powder presses and extend the area of use of the comprised toggle lever drive with respect to powder presses.

The adjustable fixed stop devices are configured as pots, wherein multiple concentric pots can be comprised, which can be moved relative to each other. A larger stroke can be realized with said design, with a limited installation space, than would be possible with elongated elements. By means of an individual movement of individual pots relative to each other, the height levels of the pressed article to be produced can be set and defined. By means of a synchronized movement of all pots, the pressing space is modified such that a pressing height adjustment is effected. This serves to compensate for wear or buckling in the case of shorter or longer punches.

In an embodiment, an electric motor is provided as an adjustment drive such that the individual fixed stop devices are moved individually and/or in a synchronized manner. Accordingly, the adjustment drives, which are in general difficult to access, can be used in a user-friendly manner by means of the control unit. This is in particular advantageous for an adjustment during the automatic operation of the powder press, during which a protective door is closed, since the operating personnel can activate the adjustment drives, for example by the control unit, and consequently no stoppage times are produced.

It can be provided that a height adjustment of a fixed stop device is effected by means of a comprised setting ring which is directly or indirectly operatively connected to the adjustment drive. For example, the setting ring can be provided with outer teeth which are in mesh with corresponding driving wheels of the adjustment drive. In order to activate the rotational movement of the setting ring, belt drives, rotor/stator drives, spindle drives or piston-cylinder units are also conceivable.

Furthermore, the dimensional stability can be improved during the production of pressed articles in an electromechanical powder press having a toggle lever drive in that the bearing of the coupling members of the toggle lever drive has, if at all possible, minimum or eliminated bearing play. The bearing play, which can occur to differing degrees in the comprised bearings of the toggle lever drive, preferably roller bearings, favors asynchronous operation and consequently leads to a misalignment and a malfunction of the press.

In an embodiment of the electromechanical powder press according to the invention, it is provided that the coupling members, or respectively the comprised lever and arms, of the toggle lever drive are connected to each other in an articulated manner by means of hinges, wherein a determined movement of the coupling members during the receiving and transmission of forces and moments is effected with reduced play, preferably free of play. For example, this can be achieved by a defined deformation of a correspondingly designed hinge element. The hinge element can be configured as a solid-body joint, wherein an elastic region is provided between the bearing receptacles of the solid-body joints, which enlarges the distance between the bearing receptacles during the application of the force vertically to a longitudinal axis of the solid-body joint. In an installed condition, i.e. without an acting force, the distance of the bearing receptacles corresponds, on the other hand, exactly to the predefined bearing axial distance. According to the invention, the elastic region can be formed by struts which connect the bearing receptacles in the form of a diamond, wherein a plurality of struts can also be provided.

BRIEF DESCRIPTION OF THE DRAWINGS

The invention is explained in greater detail below with reference to the exemplary embodiments depicted in the figures, wherein.

DETAILED DESCRIPTION OF THE EMBODIMENTS OF THE INVENTION

Figure 1:
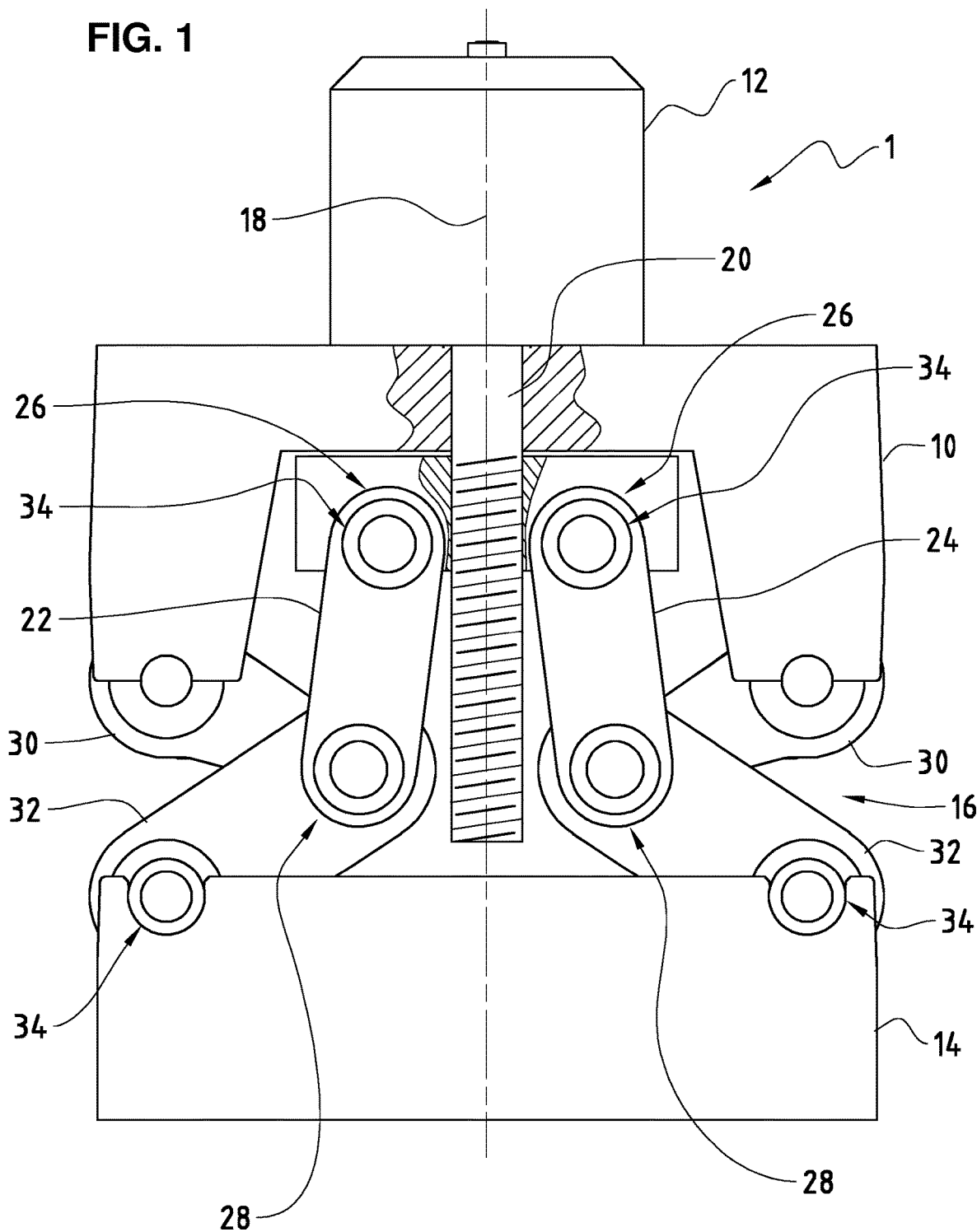
FIG. 1 shows a schematic depiction of a toggle lever drive which is arranged in a powder press in order to move an upper punch assembly.

FIG. 1 shows a top view of an upper part of a powder press 1. An upper region of a powder press 1 is solely depicted in FIG. 1, wherein a press frame is generally labeled with 10 and also comprises an upper press frame 10. A drive unit 12 which is an electric drive unit 12 is arranged on the upper press frame 10. The powder press 1 comprises, between the upper press frame 10 and an upper punch assembly 14, a toggle lever drive 16 which is arranged in such a way that it is operatively connected, on the one hand, to the drive unit 12 and, on the other hand, to the upper punch assembly 14 in order to move the latter in the direction of a pressing axis 18. A drive train 20 extending from the drive unit 12 in the direction of the upper punch assembly 14 is coupled to the toggle lever drive 16.

The comprised toggle lever drive 16 realizes, by way of a suitable geometric assembly and formation according to the lever principle and the transmission ratios, that the deflections realized by the actual drive unit 12 are multiplied. Within the framework of the invention, a toggle lever is understood to be a device or respectively an element for transmitting forces and/or transferring forces, which comprises at least two single-arm levers having a common end point (as a rule, configured as a movable pivot point), wherein the free ends of the single-arm levers which are supported against one or more bodies can be moved under the influence of a force acting on the common end.

Figure 2:
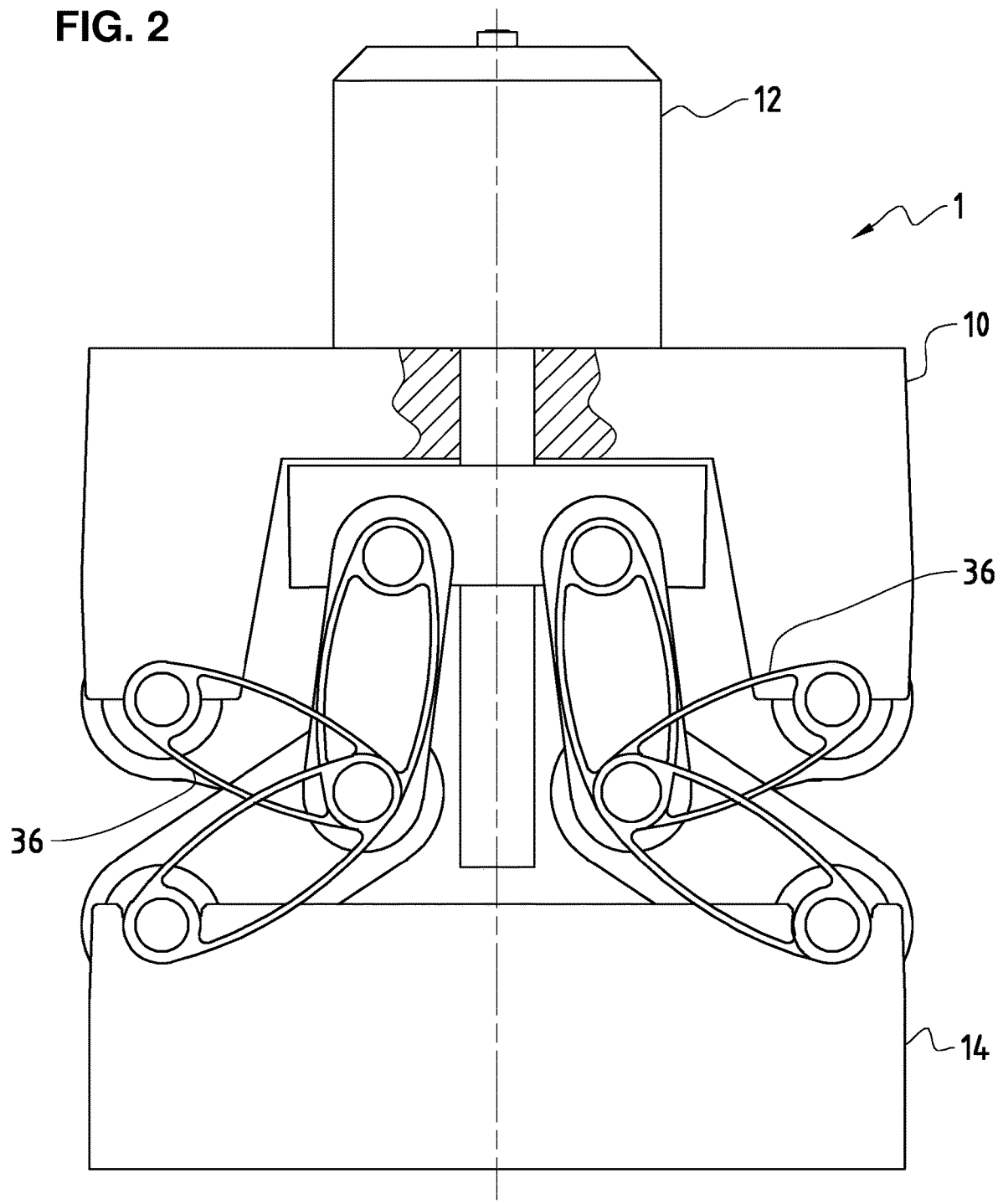
FIG. 2 shows a schematic depiction of the toggle lever drive according to FIG. 1 having solid-body joints.

The toggle lever drive 16 comprises, symmetrically to the pressing axis 18, at least one first lever 22 and one second lever 24 each, which are each swivelably hinged to a first end of the levers 26 on the drive train 20. A first arm 30 for connection to the upper press frame 10 of the powder press 1 and a second arm 32 for connection to the upper punch assembly 14 are each swivelably hinged to a second end 28 of each lever. Accordingly, a four-bar system is formed, which transmits the movement originating from the drive unit 12 to the upper punch assembly 14 such that the latter is moved along the pressing axis 18. The comprised joints are generally labeled with 34 and are arranged between the arms 30, 32 and levers 22, 24 and to the drive train 20, as well as the articulation points to the upper press frame 10 and the upper punch assembly 14. The joints 34 are preferably roller bearings. To ensure that the movement and the produced pressing force is transmitted directly and free of play to the upper punch assembly 14, it is provided that the bearings are pretensioned by means of solid-body joints 36. Solid-body joints 36 provide a flexible connection between first and second structural components. In FIG. 2, the upper part of a powder press 1 is depicted, from which the assembly of solid-body joints 36 in the toggle lever drive 16 is visible.

Figure 3:
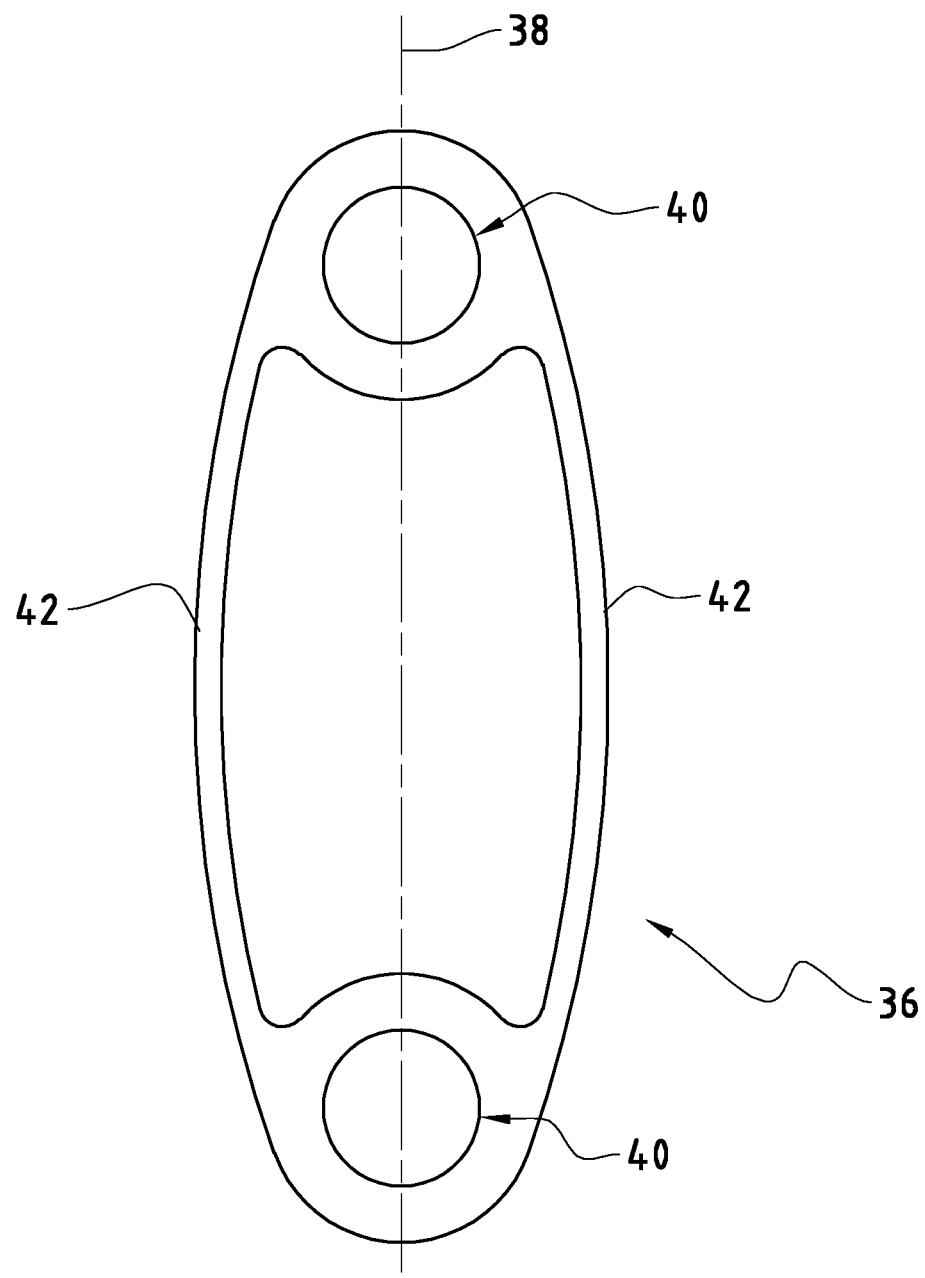
FIG. 3 shows a schematic depiction of a solid-body joint of the toggle lever drive according to FIG. 1.

In FIG. 3, the solid-body joints 36 provided in the powder press 1 are individually schematically depicted. In order to realize a highly accurate positioning of an object relative to another object and/or a stationary coordinate system, solid-body joints 36 within the framework of solid-body joint modules are known. A solid-body joint 36 is, in general, understood to be a body which comprises a point having reduced stiffness. The reduced stiffness is, as a rule, realized by a local reduction in the cross-section or by a suitable shaping.

According to an embodiment depicted in FIG. 3, a solid-body joint 36 is an elongated element which is configured mirror symmetrically to a longitudinal axis 38. At a first end and a second end, bearing receptacles 40 are configured, in which shafts or respectively axes can be received in bearings. In order to produce the required reduced stiffness, struts 42 are provided between the bearing receptacles 40, which struts span between them, for example, an elliptical shape or a diamond shape. Other shapes are conceivable, wherein, on the one hand, a certain flexibility in a region and, on the other hand, a stiffness overall are to be observed such that a plurality of struts having a possibly reinforced central region can also be provided. Thanks to the shaping of the solid-body joint 36, a distance between the bearing receptacles 40 can be modified, in particular can be enlarged, during the pressing together of the struts 42, i.e. during the application of pressure vertically to the longitudinal axis 38.

Figure 4:
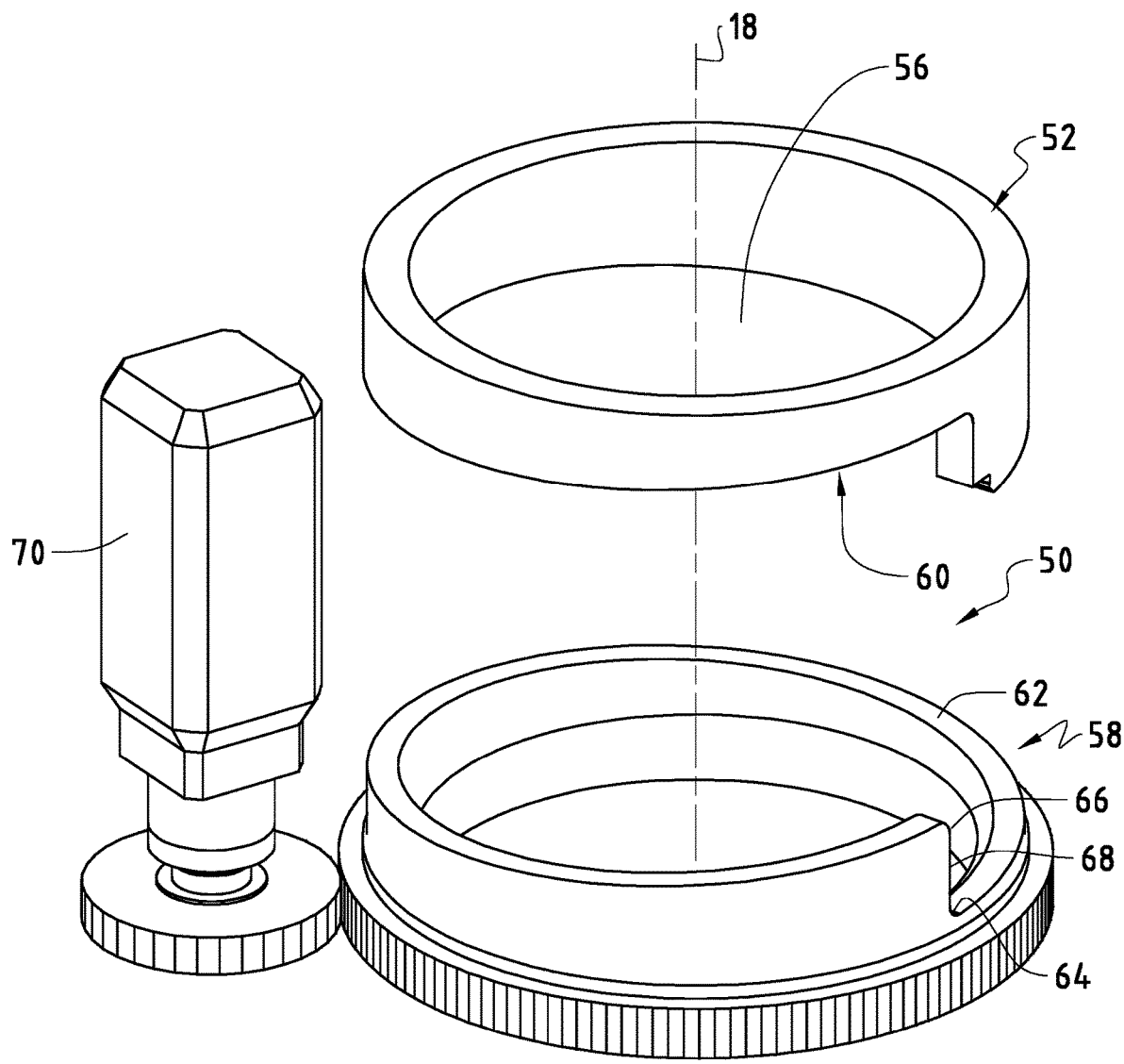
FIG. 4 shows a schematic depiction of an adjustable fixed stop.

In FIG. 4, a fixed stop device 50 is depicted, in order to specify a pressing end position. A pressing position circumscribes a position of the components of the tool used in a press, wherein punches are inserted preferably from both sides into a die opening and compress a material that can be pressed introduced therein. A pressing end position is a position in which the maximum pressing force preferably acts by way of the punches on the material located in the die opening. In the pressing end position, the punch carriers 52 are in particular supported rigidly and in a force-transmitting manner on fixed stops. In particular, the use of height-adjustable fixed stop devices 50 is advantageous.

A punch assembly, for example the upper punch assembly 14, comprises in general punch carriers 52, to which a punch (not depicted) is in each case affixed. The punch carrier 52 has an attachment surface which is preferably annular such that further inlying punches or respectively elements allocated to these punches can be guided through a central through-opening 56. The assembly is preferably arranged rotationally symmetrically around the pressing axis 18, along which the punches can be moved. In FIG. 4, a setting ring 58 is depicted, which is configured to set the pressing end position. As a result, tool wear can in particular be offset, which otherwise leads to mispresses. The punch carrier 52 rests with a lower axial end face surface 60 on an upper end face surface 62, i.e. a support surface, of the setting ring 58. The upper end face surface 62 for the allocated punch carrier 52 is configured as a helical ramp in the form of a single-thread screw face, and the thread ends 64 and 66 of the screw face, comprising a thread, are connected by a vertical connecting surface 68. The corresponding axial lower end face surface 60 of the punch carrier 52 is configured complementarily. The result of rotating the setting ring 58 is that, depending on the rotational direction, the allocated punch carrier 52 is raised or lowered. As a result, the height of the pressing end position can be modified or respectively set by way of the stroke of the punch carrier 52. In an embodiment of the setting ring 58, this can be operatively connected to an outlying adjustment drive 70 and be made to rotate by means of the latter. For example, the operative connection can be provided by means of corresponding teeth of the setting ring 58 and driving wheel of the adjustment drive 70. A belt drive, spindle drive, direct drive of the setting ring 58 are also conceivable. The adjustment drive 70 can be an electric actuating drive which makes it possible to individually specify the pressing end position. However, multiple adjustment drives 70 can also be coordinated with one another by a provided control unit such that a synchronous height adjustment of multiple punch carriers 52 is achieved.

Figure 5:
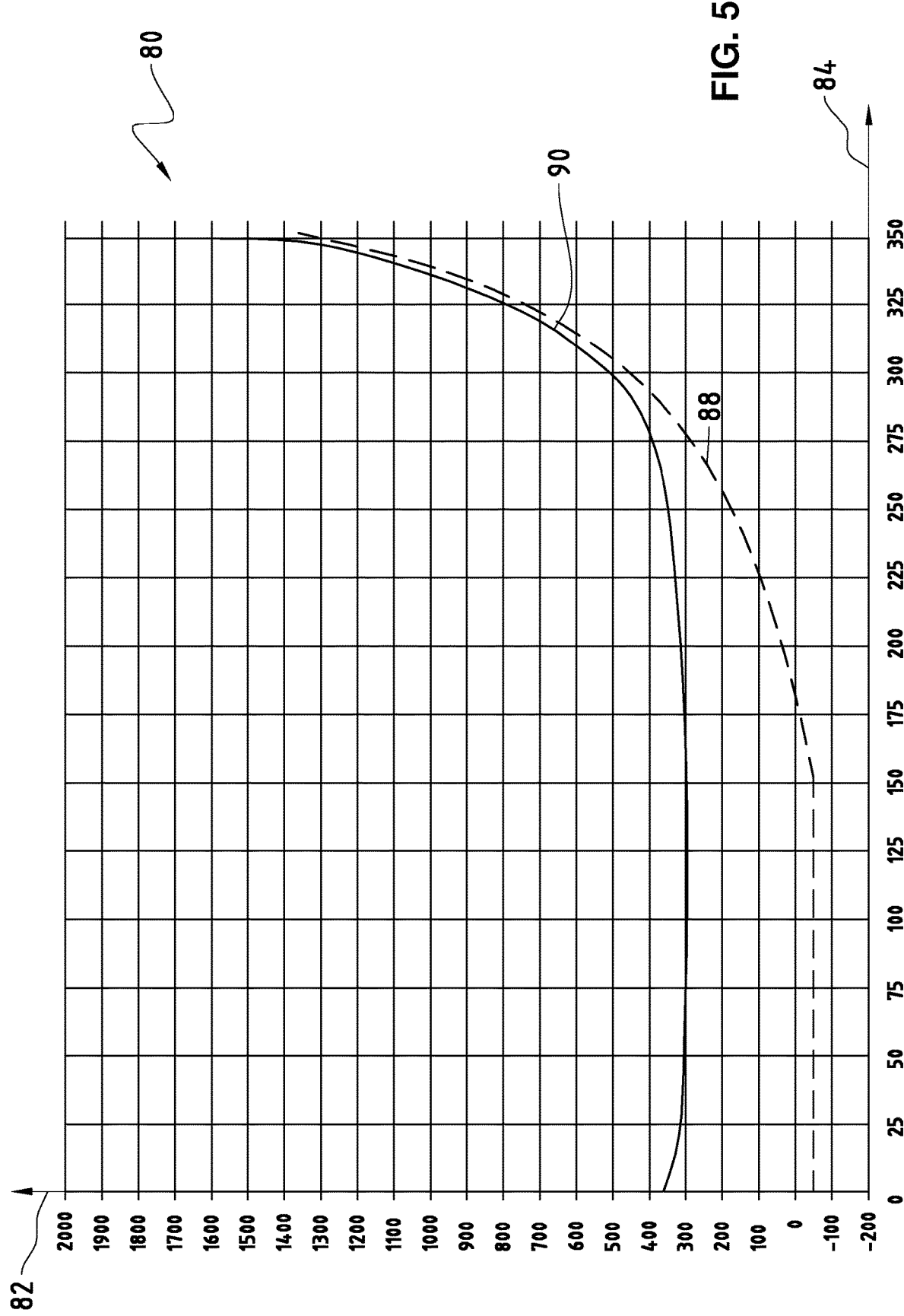
FIG. 5 shows a graphical depiction of a compaction curve of a powder during the pressing operation and the kinematics of the toggle lever drive.

FIG. 5 shows a force-path diagram 80 in order to illustrate a pressing operation in the powder press 1. In the force-path diagram, the y-axis which is allocated to the force to be applied is labeled 82. A pressing stroke travel is depicted on the x-axis, labeled with 84. To a large extent, no pressing force is required in the initial phase of a pressing cycle until the upper punch assembly or respectively the tool strikes the material that can be pressed filled in the die assembly. This initial phase should be effected as quickly as possible, since a cycle time can thus be shortened. For the pressing operation, the pressing force increases and shows a progressive pressing force course, wherein the maximum pressing force is achieved in a pressing end position. Accordingly, a large force is to be achieved with a minimum pressing stroke travel in the region of the pressing end position. This course is labeled 88 in the depiction and is dependent, inter alia, on the powder material that can be pressed and the filling height.

It is precisely this course of a force-path ratio which is fulfilled in a virtually optimum manner by a toggle lever drive 16, as depicted with the curve 90. Thus, this can be moved in an initial phase at high speed and with a great distance at low force up to close to the dead center of the toggle lever mechanism. In the region of the dead center, i.e. at a virtually extended position of the comprised levers or respectively arms, a large pressing force can be transmitted. Here, only the smallest distances are covered, but the transmittable pressing force is virtually maximal. Moreover, the arrangement of the toggle lever mechanism 16 allows movement into or respectively out of the pressing end position at high speed such that the cycle time is shortened overall.

In FIG. 5, the force-path curve 90 shows a corresponding course of a toggle lever drive with an adapted transmission ratio. By adapting the transmission and the leverage ratios of the toggle lever drive, an approximation to the ideal course of a pressing operation, illustrated by the course 88 of the powder compaction, can be achieved, wherein the optimized force-path curve 90 constantly runs above the powder compression curve 88.

The invention claimed is:

1. A powder press for producing a pressed article from a material that can be pressed, the powder press comprising:
    a press frame,
    an upper and/or lower punch assembly and a die assembly, which define a molding cavity into which the material that can be pressed can be introduced, and
    an electric drive unit which is operatively connected to the punch assembly(ies) and/or the die assembly,
    wherein, in order to mold the pressed article, the punch assembly(ies) and the die assembly are adapted to be moved relative to each other along a pressing axis and pressed against each other by means of the electric drive unit,
    wherein the operative connection between the electric drive unit and one of the punch assembly(ies) comprises a toggle lever drive which moves the one punch assembly into a pressing end position along the pressing axis, and
    wherein the pressing end position can be set by mechanical fixed stops which are height-adjustable.

2. The powder press according to claim 1, wherein the toggle lever drive is arranged between the electric drive unit and the one punch assembly, wherein, on a drive train of the electric drive unit, a first lever and a second lever are each swivelably hinged to respective first ends of the first and second levers symmetrically to the pressing axis, and a respective first arm for connection to the press frame of the powder press and a respective second arm for connection to the punch assembly are each swivelably hinged to respective second ends of the first and second levers.

3. The powder press according to claim 1, wherein kinematic dimensions of the toggle lever drive are determined such that a pressing force is produced as a function of a pressing movement in accordance with a predefined compaction curve in order to produce the pressed article.

4. The powder press according to claim 1, wherein the electric drive unit has a spindle drive having a servo motor assembly and sensors for detecting rotation angle, rotational speed and/or torque in order to regulate the servo motor assembly.

5. The powder press according to claim 1, wherein at least one position sensor is arranged in order to detect a position of the punch assembly(ies) and to transmit a signal to a control unit which is used to regulate the servo motor assembly.

6. The powder press according to claim 4, wherein the servo motor assembly is a hollow shaft electric motor in order to produce a regulated rotary drive.

7. The powder press according to claim 1, wherein the mechanical fixed stops comprise punch carriers configured as cylinders arranged concentrically to each other.

8. The powder press according to claim 7, wherein, in the pressing end position, the cylinders of the mechanical height-adjustable fixed stop having a lower axial end face surface each rest on an upper end face surface of a setting ring which is configured in the form of a single-thread screw face in order to adjust the height of the mechanical fixed stops.

9. The powder press according to claim 8, wherein the lower axial end face surface of the mechanical height-adjustable fixed stop is configured complementarily to the upper end face surface of the setting ring (58), such that by rotating the setting ring by means of an actuating drive the height of the mechanical fixed stop is adjusted.

10. The powder press according to claim 7, wherein the height of the pressing is adjusted by a synchronized rotating of the setting rings.

11. The powder press according to claim 10, wherein the actuating drive is configured as an electric motor in order to individually and synchronously drive the setting rings.

12. The powder press according to claim 1, wherein the toggle lever drive comprises bearings which are pretensioned by means of hinge elements in such a way in order to reduce play in the bearings.

13. The powder press according to claim 12, wherein the hinge elements are configured as solid-body joints which have bearing receptacles which are connected to each other by means of struts which are arranged in a diamond form.

14. The powder press of claim 1, wherein each punch assembly comprises a plurality of punches arranged on separate, respective punch carriers, wherein the plurality of punches and their corresponding punch carriers move with respect to a corresponding base carrier or base plate, and wherein during a pressing process, each punch of the plurality of punches is moved into a respective pressing end position.

15. The powder press of claim 14, wherein in the pressing end position, punch carriers are rigidly supported on the mechanical fixed stops, a punch of the punch assembly being affixed to the punch carriers.

* * * * *